(12) United States Patent
Shih

(10) Patent No.: US 6,755,113 B2
(45) Date of Patent: Jun. 29, 2004

(54) ACCUMULATED SEMI-ACTIVE HYDRAULIC DAMPER

(75) Inventor: Ming-Hsiang Shih, Kaohsiung Hsien (TW)

(73) Assignee: Ha Wse Company Limited, Taipei (TW)

( * ) Notice: Subject to any disclaimer, the term of this patent is extended or adjusted under 35 U.S.C. 154(b) by 49 days.

(21) Appl. No.: 10/207,245

(22) Filed: Jul. 30, 2002

(65) Prior Publication Data

US 2004/0020355 A1 Feb. 5, 2004

(51) Int. Cl.[7] ............................................. F15B 21/00
(52) U.S. Cl. ........................... 91/5; 60/413; 92/85 B
(58) Field of Search ................. 91/5, 358 R; 60/413, 60/463, 414; 92/85 B; 188/266.5; 267/64.11

(56) References Cited

U.S. PATENT DOCUMENTS

| | | | | |
|---|---|---|---|---|
| 3,807,678 A | * | 4/1974 | Karnopp et al. | 188/266.5 |
| 4,655,440 A | * | 4/1987 | Eckert | 267/64.11 |
| 4,936,423 A | * | 6/1990 | Karnopp | 188/266.5 |
| 5,098,119 A | * | 3/1992 | Williams et al. | 60/585 |
| 6,206,154 B1 | * | 3/2001 | Chino et al. | 188/318 |

* cited by examiner

Primary Examiner—Edward K. Look
Assistant Examiner—Igor Kershteyn
(74) Attorney, Agent, or Firm—Rosenberg, Klein & Lee

(57) ABSTRACT

A semi-active hydraulic damper includes a cylinder, an accumulator, an oil box, and a directional control member. A directional control valve of the directional control member is connected to a first, and a second primary oil circuits, which are respectively connected to the ports of two ends of the cylinder body. The valve can switch among various positions according to signals of a sensor provided for sensing movement of the structure. Vibratory movement of the structure that causes a displacement of the upper joint relative to the lower joint of the structure can be counteracted by pressure of oil, which is allowed to flow into the cylinder from the accumulator via selected one of the ports to move the piston in a direction opposite to the displacement by switching the directional control valve.

12 Claims, 4 Drawing Sheets

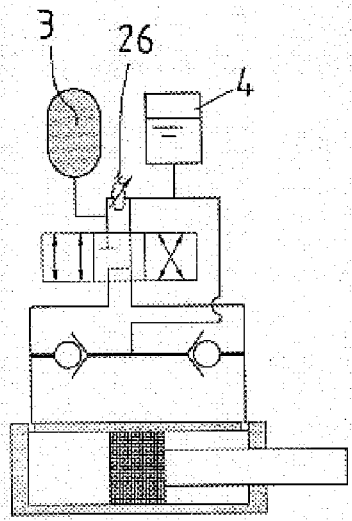
F I G. 11
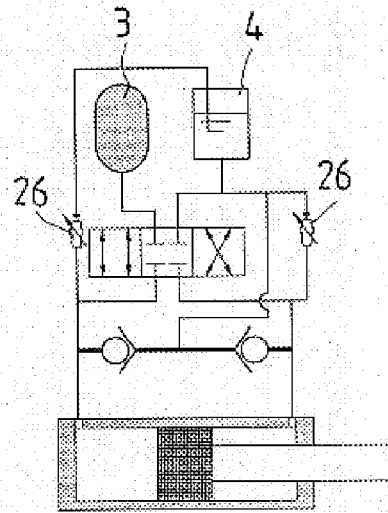
F I G. 12
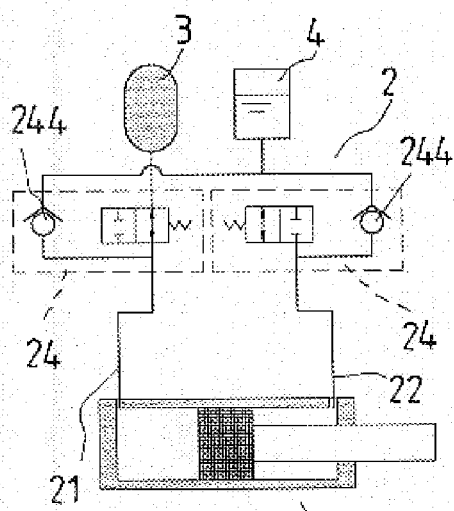
F I G. 9
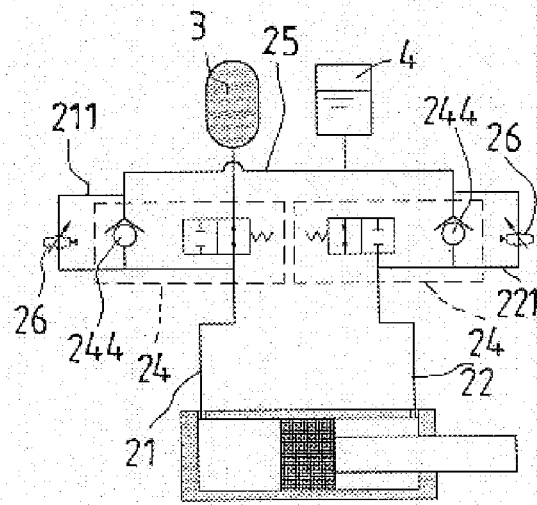
F I G. 10

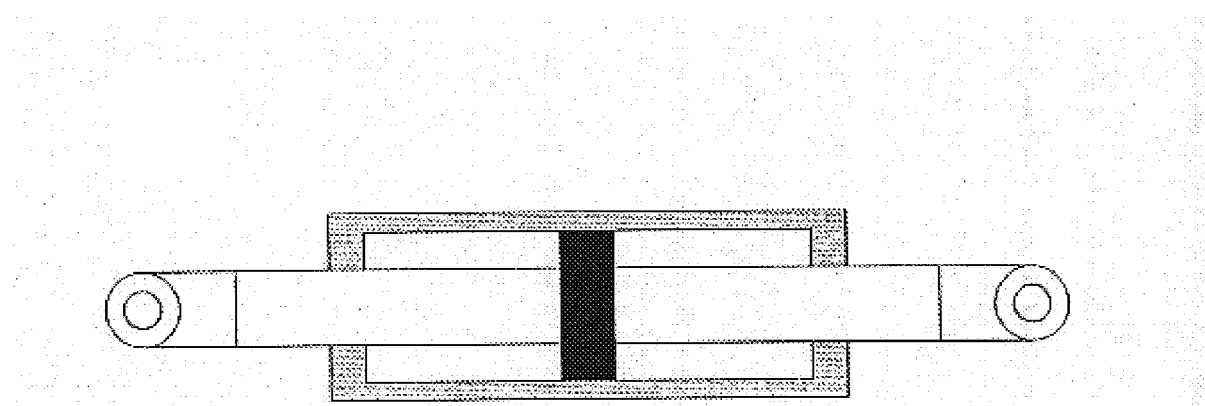
F I G. 13
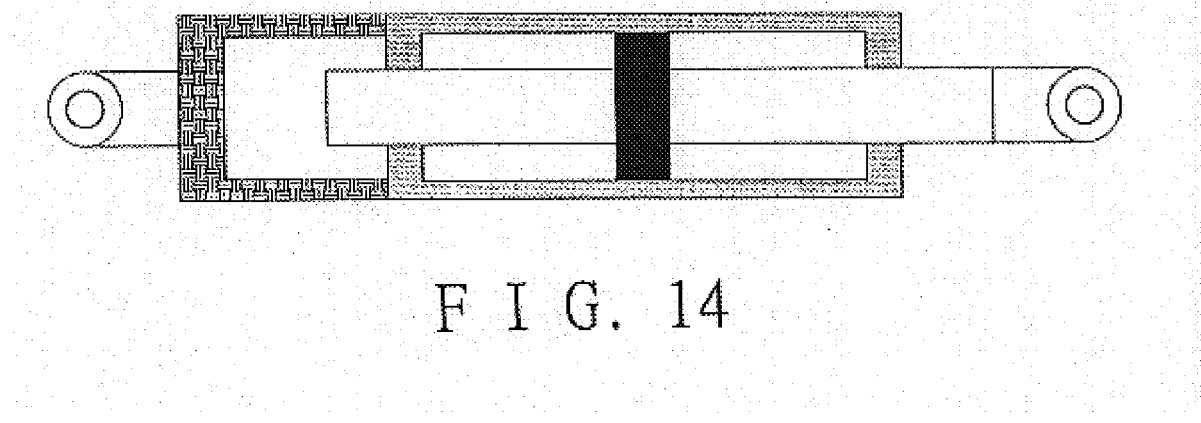
F I G. 14

ACCUMULATED SEMI-ACTIVE HYDRAULIC DAMPER

BACKGROUND OF THE INVENTION

The present invention relates to an accumulated semi-active hydraulic damper, more particularly one, in which an accumulator is exploited for relieving, and storing excessive pressure of the hydraulic oil of the circuit in the energy reducing operation thereof and which can achieve a relatively high damping ratio while it is not constructed of sophisticated control devices that are relatively expensive.

There are many conventional vibration counteracting methods for engineering constructions, which are:

1. Base isolation; in this method, a passive damping material such as elastic compound or other energy absorber is interposed between the structure and the foundation. The advantage of this method is that natural frequency of the structure will be reduced to avoid the primary frequency range of the earthquake, while the disadvantage is that the damping ratio would be greatly reduced if the structure is a long period one or situated near a fault zone.
2. Active control; in this method, online monitoring of the structural vibration response is exploited wherein data on relative displacement, velocity and acceleration of the structure subject to vibration is analyzed and calculated for determining the amount of force to be applied to counteract the vibration, and it requires an actuator of quick frequency response. Therefore, a lot of sophisticated devices such as vibration sensors, data acquisition devices, online computers, servo controllers, and precise actuators are needed, making the cost significantly increase. The need of continuous electric power supply to function makes active control have the disadvantage of low reliability in light of the fact that earthquake is often followed by power failure. Currently, active control has not been put to use for counteracting vibration of earthquake.
3. Passive control; a damping device of this type doesn't have to be regulated in amount of force, and is not provided with function of monitoring the structural vibration response; a passive damper is ready to function immediately after it is installed. There are two main types of passive controls, which are dynamic interaction method and energy dissipation method. The dynamic interaction method applies a sub-oscillator, which is installed on the structure subject to vibration, and is relatively light in weight as compared with the structure, and has a self-oscillation frequency that is the same as, or approximates to, that of the structure, therefore the sub-oscillator can reduce the effect of vibration of the structure. This method is usually installed on uppermost portions of high buildings or long bridges to reduce the oscillation caused by wind. The disadvantage of dynamic interaction method is that accurate analysis on the mechanical property has to be done previously, otherwise the vibration reducing effect will decrease. An example of energy dissipation method is the use of steel plate with specific shape in a structure; the energy of motion of the structure caused by earthquake is dissipated by means of the hysteretic behavior that is caused when the steel board is experiencing plastic deformation. The cost of the energy dissipation method is relatively low. However, steel plate is subject to low cycle fatigue when the plastic deformation happens in a two-way manner repeatedly. And, it is not suitable for reducing the effect of wind. Another example of energy dissipation method is the use of a hydraulic damper, which has a sealed container having liquid therein; the viscous damping of fast flowing liquid in the container will exert negative work to the structure to reduce vibration. The hydraulic damper can reduce displacement and acceleration of the structure, and won't have residual deformation. However, its self oscillation frequency is too low, and the viscous damping has very limited effect.
4. Semi-active control; Semi-active control method has the adaptability of active control method as well as the reliability and low power consumption of passive control method. Semi-active control methods are usually provided by means of improving passive control methods. According to experiments, a large damping coefficient of a damper doesn't guarantee satisfactory energy damping performance, while a relatively small damping coefficient might help the damper work with suitable timing to have best performance. For instance, a semi-active damper with continuous control of force, patented by Taiwan Patent Office with no. 339396, has a sensor, and two precision flow rate control valves or proportional valves to sense the response of the structure, and to continuously control the amount of force of the damper respectively. These precision valves will cause a large increase of the cost of the damper. Because the primary purpose of such damper is to reduce the relative displacement of various portions of the structure, continuous control seems unnecessary.

From the above analysis, we have conclusions as followings:

1. Active control method provides the best performance. However, it is very expensive to construct, and has problem of stability yet to be dealt with. Therefore, active control has not been put to use for counteracting vibration of earthquake.
2. Base isolation is not suitable for use with structures that are of long cycle type or situated near a fault zone.
3. The fact that passive control is not suitable for reducing the vibration caused by wind and various types of earthquakes gives rise to the development of semi-active control. However, there is not much difference between conventional dampers of semi-active control type and active dampers because semi-active control still emphasizes continuous control and optimization, resulting in the use of sophisticated servo controllers and precision flow rate control valves that make semi-active dampers nearly as expensive as active ones.

SUMMARY OF THE INVENTION

It is a main object of the present invention to provide an accumulated semi-active hydraulic damper, which can provide a relatively good damping effect, and is easy and inexpensive to construct.

The damper of the present invention includes a cylinder, an accumulator, an oil box, and directional control components. The cylinder body is connected to a lower joint of a structure at one end, while the piston rod is connected to an upper joint of the structure, or reverse.

The directional control components include a directional control valve, a first primary oil circuit, and a second primary oil circuit. The directional control valve can switch among various positions thereof according to a signal of the sensor, which is translated from movement of the structure sensed by means of the sensor. The directional control valve is connected to both the oil box and the accumulator. The first oil circuit is connected to the first port of the cylinder body, and connected to the directional control valve. The second oil circuit is connected to the second port of the cylinder body, and connected to the directional control valve.

Thus, vibratory movement of the structure that causes a displacement of the upper joint relative to the lower joint can be counteracted when the sensor senses the movement to make the directional control valve switch among positions thereof such that hydraulic oil of the accumulator can flow through suitable one of the ports of the cylinder body to move the piston rod in a direction opposite to the displacement.

BRIEF DESCRIPTION OF THE DRAWINGS

The present invention will be better understood by reference to the accompanying drawings, wherein:

FIG. 9 is an oil circuit diagram of the damper of the second embodiment of the invention.

FIG. 10 is an oil circuit diagram of the damper of the third embodiment of the invention.

FIG. 11 is an oil circuit diagram of the damper of the fourth embodiment of the invention.

FIG. 12 is an oil circuit diagram of the damper of the fifth embodiment of the invention.

FIG. 13 is a view of another type of cylinder according to the invention.

FIG. 14 is a view of a third type of cylinder according to the invention.

DETAILED DESCRIPTION OF THE PREFERRED EMBODIMENTS

Figure 1:
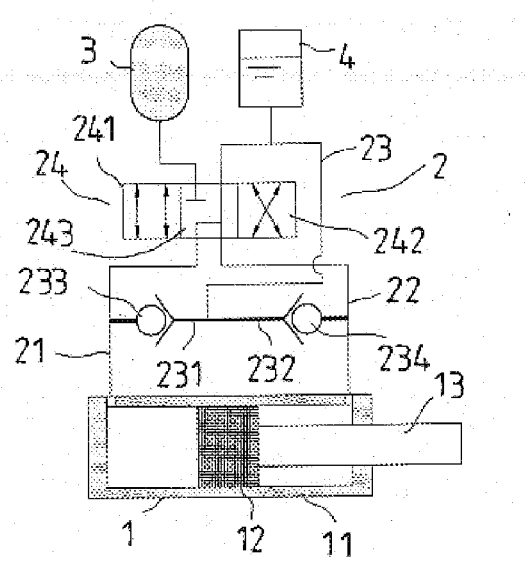
FIG. 1 is an oil circuit diagram of the damper of the first embodiment of the invention.

Referring to FIG. 1, an accumulated semi-active hydraulic damper of the present invention includes a cylinder 1, a directional control member 2, an accumulator 3, and an oil box 4.

Figure 2:
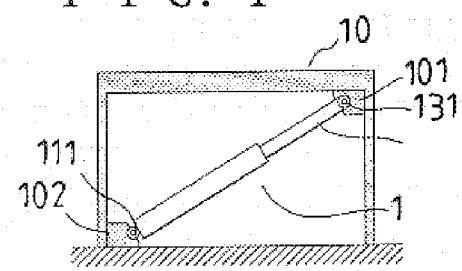
FIG. 2 is a plan of the damper of the present invention.

The cylinder 1 includes a cylinder body 11, a piston 12, and a piston rod 13. Referring to FIG. 2, the cylinder body 11 is provided with a connector 11 at one end, and the piston 12 is movably disposed in the cylinder body 11. The piston rod 13 is affixed to one side of the piston to stick out from the other end of the cylinder body 11 so that it can be moved together with the piston 12. The piston rod 13 is provided with a connector 131 at the outer end. The connectors 111, and 131 are respectively connected to a lower and an upper joint 102, and 101 of a structure 10 subject to vibration. The cylinder body 11 has a first and a second port at two ends thereof.

The directional control member 2 includes a first and second primary oil circuits 21, and 22, a returning oil route 23, and a directional control valve 24. The directional control valve 24 is of the type that is equipped with solenoids to be operated by means of electromagnetic force, and has four ports and three positions, which are left-valve-position, neutral-valve-position, and right-valve-position in sequence. The directional control valve 24 is electrically connected to a controller (not shown) so that the controller can make the valve 24 switch positions according to signals of vibration sensor, which are translated from a movement of the structure 10 by means of the sensor after the sensor senses the movement. The directional control valve 24 is connected to both the oil box 4 and the accumulator 3. The accumulator 3 contains oil therein, and is provided with an initial pressure. The oil box 4 can be of the type that provides a relatively low pressure, or can be of a sealed booster tank type or replaced with a low pressure accumulator. The accumulator 3 can be of the type that provides high but constant pressure. The neutral-valve-position 243 of the directional control valve 24 can be used for stopping oil from traveling through or for allowing oil to travel through.

The first primary oil circuit 21 includes a conduit tube, which is connected to the first port of the cylinder body 11 at a first end, and is connected to the directional control valve 24 at a second end. The second primary oil circuit 22 includes a conduit tube, which is connected to the second port of the cylinder body 11 at a first end, and connected to the directional control valve 24 at a second end.

The returning oil route 23 is connected to the oil box 4 at one end. The returning oil route 23 becomes two branches 231, and 232 at the other end, which are connected to a respective end of the cylinder body 11. The branches 231, 232 are each equipped with a check valve 233, 234 so that the hydraulic oil is only allowed to flow from the oil box 4 to the cylinder body 11.

Figures 6, 7, 8:
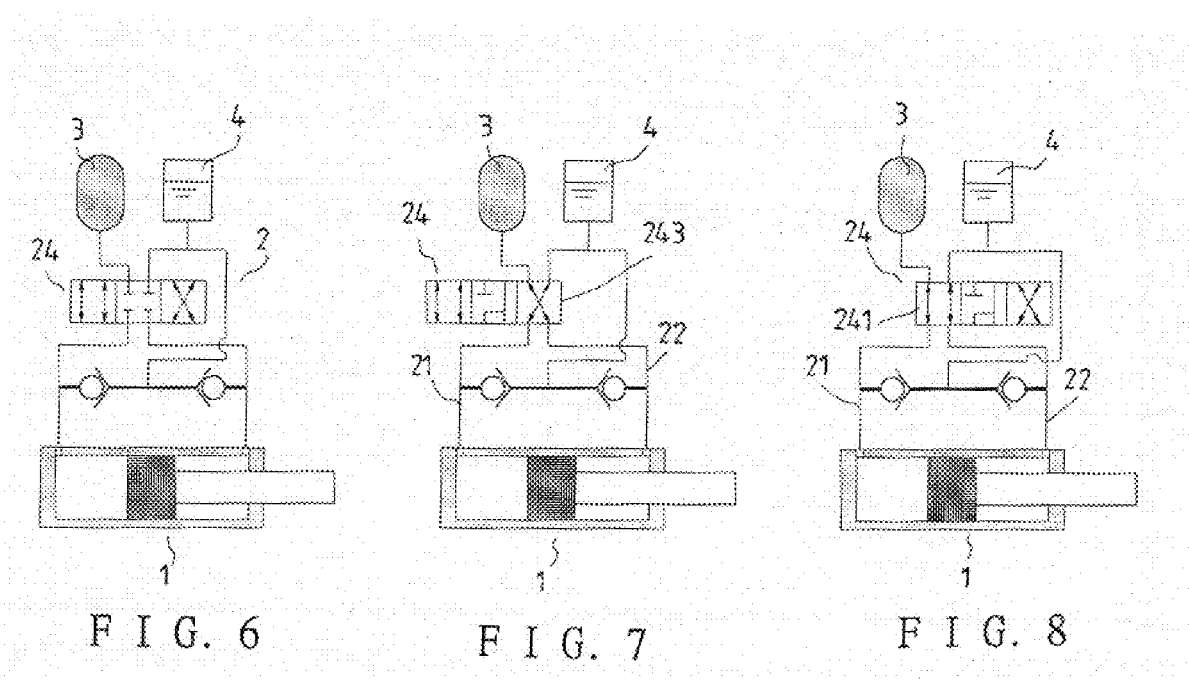
FIG. 6 is an oil circuit diagram of the damper of the first embodiment with another type of directional control valve.
FIG. 7 is a view of the damper of the invention in operation.
FIG. 8 is another view of the damper of the invention in operation.

When the structure 10 is enduring vibration, the sensor will sense the speed of displacement of the upper joint 101 relative to the lower joint 102 that is caused by the external excitation, and translate the speed into a signal, which is immediately provided to the controller that is connected to the directional control valve 24. If the speed is a positive value, i.e. the distance between the upper and lower joints 101, 102 is getting bigger, the signal of the sensor will make the directional control valve 24 move to such a position that the right-valve-position 242 can function, as shown in FIG. 7, thus causing the second primary oil circuit 22 to communicate with the accumulator 3 immediately to increase the oil pressure of the right portion of the cylinder 1. Therefore, the vibratory motion is counteracted. And, the accumulator 3 is made to store more pressure with the distance between the upper and lower joints 101, 102 getting bigger.

If the speed is a negative value, i.e. the distance between the upper and lower joints 101, 102 is getting smaller, the signal of the sensor will make the directional control valve 24 move to such a position that the left-valve-position 241 can function, as shown in FIG. 8, thus causing the first primary oil circuit 21 to communicate with the accumulator 3 immediately to increase the oil pressure of the left portion of the cylinder 1. Therefore, the vibratory motion is counteracted. And, the accumulator 3 is made to store additional pressure with the distance between the upper and lower joints 101, 102 getting smaller.

When the structure 10 is stationary, the directional control valve 24 is moved to a position as shown in FIG. 1 such that the neutral-valve-position 243 is adjacent to the circuits 21, and The Second Embodiment:

Referring to FIG. 9, an accumulated semi-active hydraulic damper of the second embodiment is substantially the same as the first embodiment except that the returning oil route 23, and the directional control valves 24 are replaced with two directional control valves 24, 24; the directional control valves 24, 24 each has a check valve 244, and communicate with the oil box 4, and a respective one of the ports of the cylinder body 11; one of the directional control valves 24 communicates with the accumulator 3, plus except that the first conduit tube is connected to one of the directional control valve, while the second conduit tube is connected to the other one of the directional control valves 24.

The Third Embodiment:

Referring to FIG. 10, an accumulated semi-active hydraulic damper of the third embodiment is substantially the same as the second embodiments except that it is further equipped with two secondary oil circuits 211, 211 communicating with the first, and the second conduit tubes respectively; the secondary oil circuits 211, 211 are each equipped with a relief valve 26 so that part of vibratory energy of the structure 10 can be absorbed via the relief valves 26, 26 when the sensor fails to function properly, and the relief valve can act as a fuse to avoid exceeding of oil pressure.

The Fourth Embodiment:

Referring to FIG. 12, an accumulated semi-active hydraulic damper of the fourth embodiment is substantially the same as the first embodiment except that the first, and the second conduit tubes of the oil circuits 21, and 22 are each connected to one relief valve 26 that is connected to the oil box 4 by means of a conduit tube.

The Fifth Embodiment:

Referring to FIG. 11, an accumulated semi-active hydraulic damper of the fifth embodiment is substantially the same as the first embodiment except that a tube equipped with a relief valve 26 is provided, which communicates with the oil box 4 at one end, and with a conduit tube connected to the accumulator 3 at other end.

Figure 4:
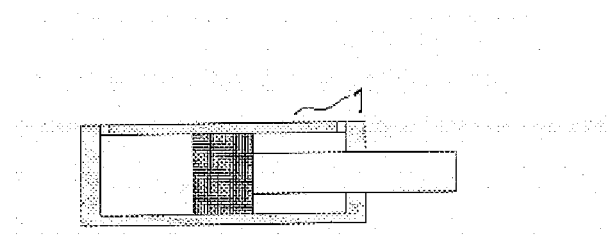
FIG. 4 is a view of a cylinder according to the present invention.
Figure 5:
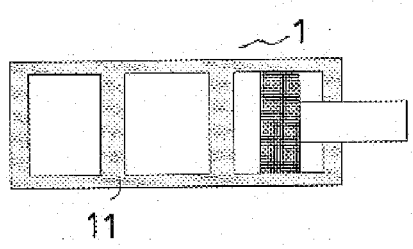
FIG. 5 is a view of another cylinder according to the present invention.
Figure 3:
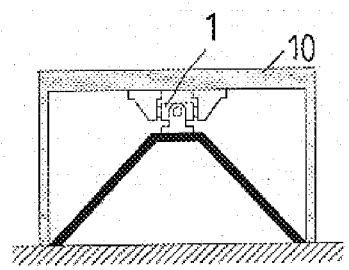
FIG. 3 is another plan of the damper of the present invention.

Furthermore, the cylinder 1 can be replaced with cylinders of two-directional type as shown in FIGS. 13, and 14. In the cylinder of FIG. 13, a second piston rod is affixed to other side of the piston at one end. Both the first and the second piston rods are respectively connected to one of two joints, and the cylinder body 11 is connected to the other joint of the structure, as shown in FIG. 3. And, referring to FIG. 5, the cylinder body 11 can be made to consist of three compartments, which are used as the accumulator, the oil box, and for receiving the piston respectively.

From the above description, it can be understood that the accumulated semi-active hydraulic damper of the present invention can apply energy, which the same is made to produce by the vibration caused displacement of one end relative to the other, to counteract the vibratory movement, thus having relatively good damping effect. In addition, the damper of the present invention has advantages as followings:

1. The damper is made of relatively simple and ordinary parts, and a solenoid operated valve, therefore the manufacturing cost is relatively low.
2. The control units of the damper don't have problems of fatigue and wear, therefore there won't be much maintenance needed.
3. The damper is constructed such that it still can absorb part of vibratory energy of the structure via the relief valves in a passive manner when the sensor fails to function. Therefore, the reliability is relatively high.
4. Using relatively small energy to counteract the vibration, the damper still can function in extreme conditions while having no bad effect on the structure equipped with the damper.

What is claimed is:

1. An accumulated semi-active hydraulic damper, comprising:
   A. a cylinder including
      i. a cylinder body connected to a first joint of a structure subject to vibration at one end thereof, the cylinder body having a first and a second ports at two ends thereof;
      ii. a piston movably disposed in the cylinder body;
      iii. a piston rod affixed to one side of the piston at one end, and connected to a second joint of the structure at other end;
   B. an accumulator containing oil with an initial pressure therein;
   C. an oil box containing hydraulic oil therein; and,
   D. a directional control member including
      i. a directional control valve, the directional control valve being capable of switching positions according to a signal, which is translated from a movement of the structure by means of a sensor after the sensor senses the movement, the directional control valve being connected to both the oil box and the accumulator, the directional control valve being a solenoid operated valve having four ports and three positions;
      ii. a first conduit tube connected to the first port of the cylinder body at a first end thereof, and connected to the directional control valve at a second end;
      iii. a second conduit tube connected to the second port of the cylinder body at a first end thereof, and connected to the directional control valve at a second end; and,
      iv. a returning oil route connected to the oil box at one end, the returning oil route having two branches at other end, each being connected to a respective one of said first and second ends of the cylinder body, the branches of the returning oil route being equipped with check valves so that the hydraulic oil is only allowed to flow from the oil box to the cylinder body;
   whereby vibratory movement of the structure that causes a displacement of the first joint relative to the second joint can be counteracted when the sensor senses the movement to make the directional control valve switch among a plurality of positions thereof such that hydraulic oil can be made to flow into the cylinder body from the accumulator via one of the ports to move the piston rod in a direction opposite to the displacement.

2. The accumulated semi-active hydraulic damper of claim 1, wherein the first, and the second conduit tubes are each connected to one relief valve, which is connected to the oil box by means of a tube.

3. The accumulated semi-active hydraulic damper of claim 1, wherein a tube equipped with a relief valve is connected to a conduit tube connecting the accumulator and the oil box.

4. The accumulated semi-active hydraulic damper of claim 1, wherein a second piston rod is affixed to other side of the piston at one end, and is connected to the structure at other end, and the cylinder body is affixed to a third joint instead of the first joint.

5. The accumulated semi-active hydraulic damper of claim 1, wherein the cylinder body consists of three compartments, which are used as the accumulator, the oil box, and for receiving the piston respectively.

6. The accumulated semi-active hydraulic damper of claim 1, wherein the oil box is an airtight booster tank type of oil box.

7. The accumulated semi-active hydraulic damper of claim 1, wherein the oil box is replaced with a low pressure accumulator.

8. The accumulated semi-active hydraulic damper of claim 1, wherein the accumulator is of a constant pressure type.

9. The accumulated semi-active hydraulic damper of claim 1, wherein a neutral position of the directional control valve is of a neutral-stopped type.

10. The accumulated semi-active hydraulic damper of claim 1, wherein a neutral position of the directional control valve is provided for allowing oil to travel through the valve.

11. An accumulated semi-active hydraulic damper, comprising
   A. a cylinder including
      i. a cylinder body connected to a first joint of a structure subject to vibration at one end thereof; the cylinder body having a first and a second ports at two ends thereof;
      ii. a piston movably disposed in the cylinder body;
      iii. a piston rod affixed to the piston at one end, and connected to a second joint of the structure at other end;
   B. an accumulator containing oil with an initial pressure therein;
   C. an oil box containing hydraulic oil therein; and,
   D. a directional control member including
      i. a pair of directional control valves; the directional control valves being capable of switching positions according to a signal, which is translated from a movement of the structure by means of a sensor after the sensor senses the movement; the directional control valves each having a check valve, and being connected to the oil box and a respective one of the ports of the cylinder body; one of the directional control valves being connected to the accumulator;
      ii. a first conduit tube connected to the first port of the cylinder body at a first end thereof, and connected to one of the directional control valve at a second end; and,
      iii. a second conduit tube connected to the second port of the cylinder body at a first end thereof, and connected to other one of the directional control valve at a second end;
   whereby vibratory movement of the structure that causes a displacement of the first joint relative to the second joint can be counteracted when the sensor senses the movement to make the directional control valve switch among a plurality of positions thereof such that hydraulic oil can be made to flow into the cylinder body from the accumulator via one of the ports to move the piston rod in a direction opposite to the displacement.

12. The accumulated semi-active hydraulic damper of claim 11, wherein
   two secondary oil circuits are provided to communicate with the first, and the second conduit tubes respectively; the secondary oil circuits being each equipped with a relief valve so that part of vibratory energy of the structure can be absorbed via the relief valves when the sensor fails to function.

* * * * *